Patented Sept. 13, 1932

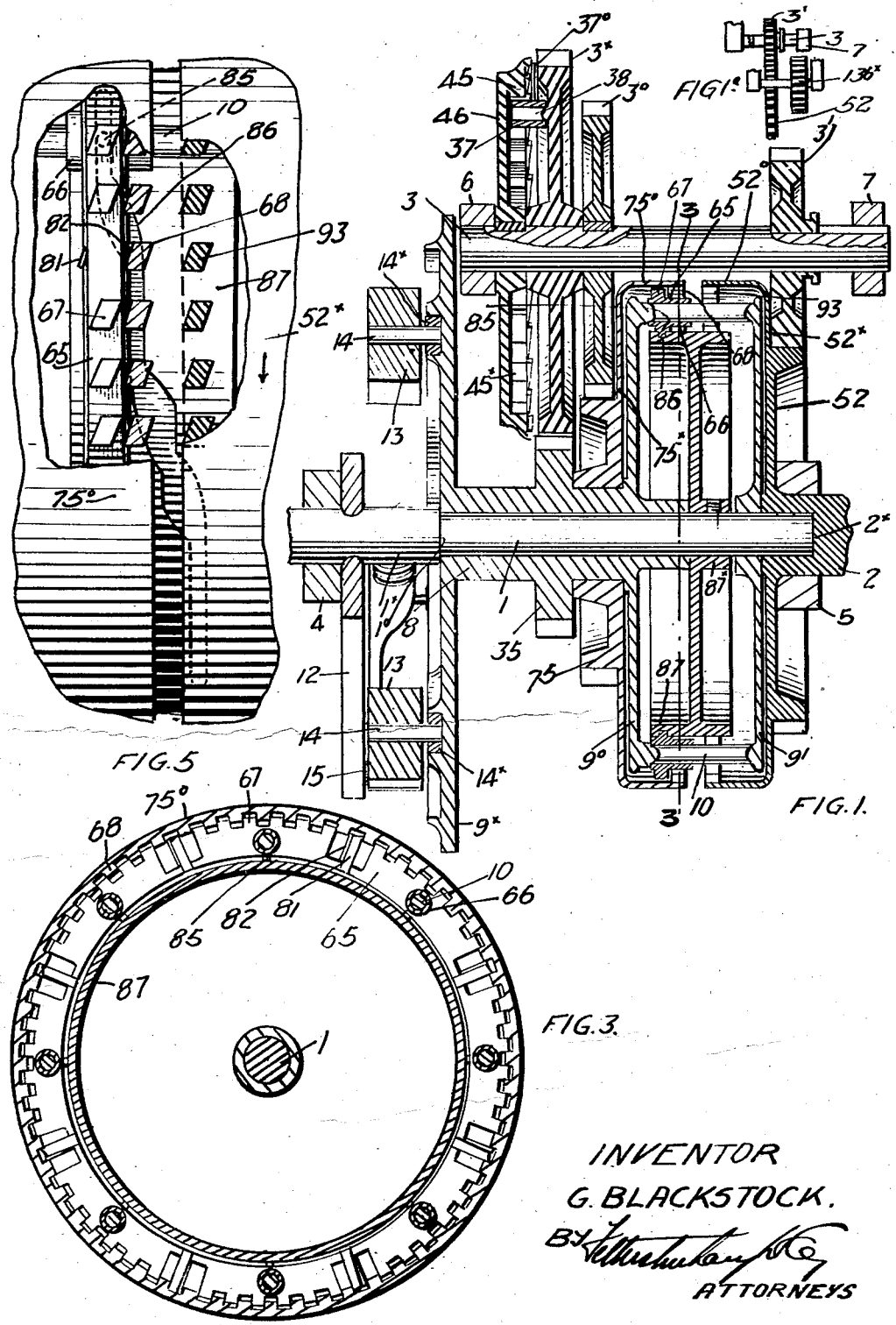

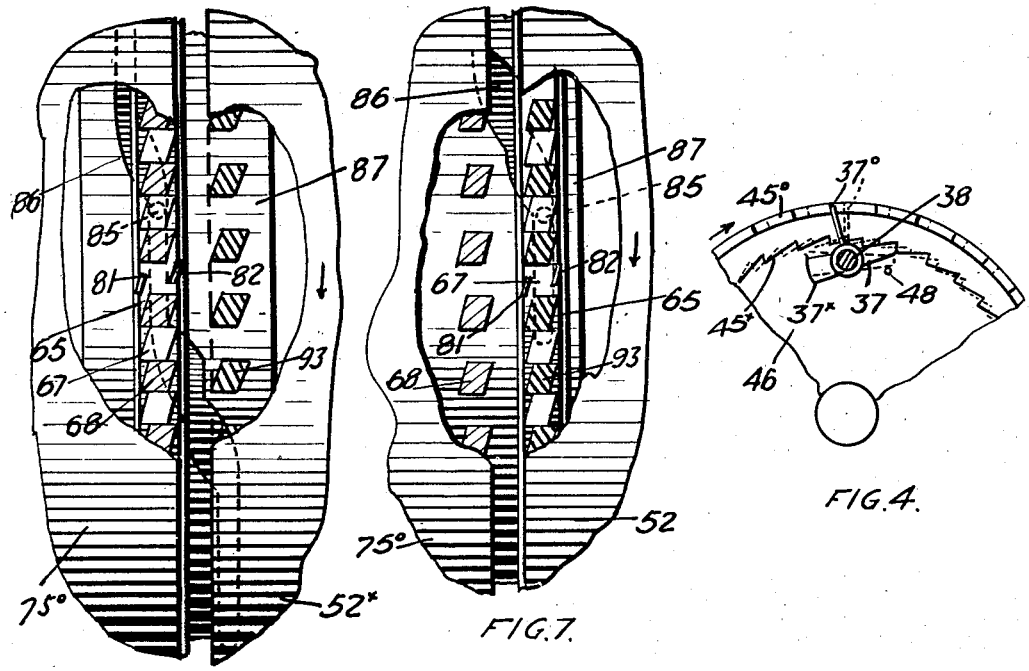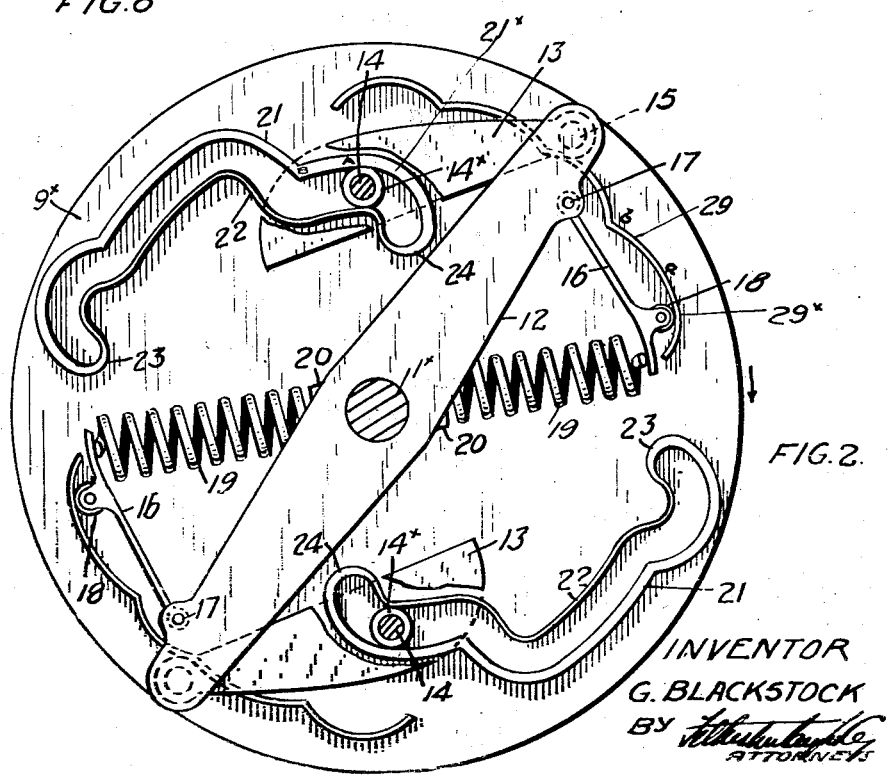

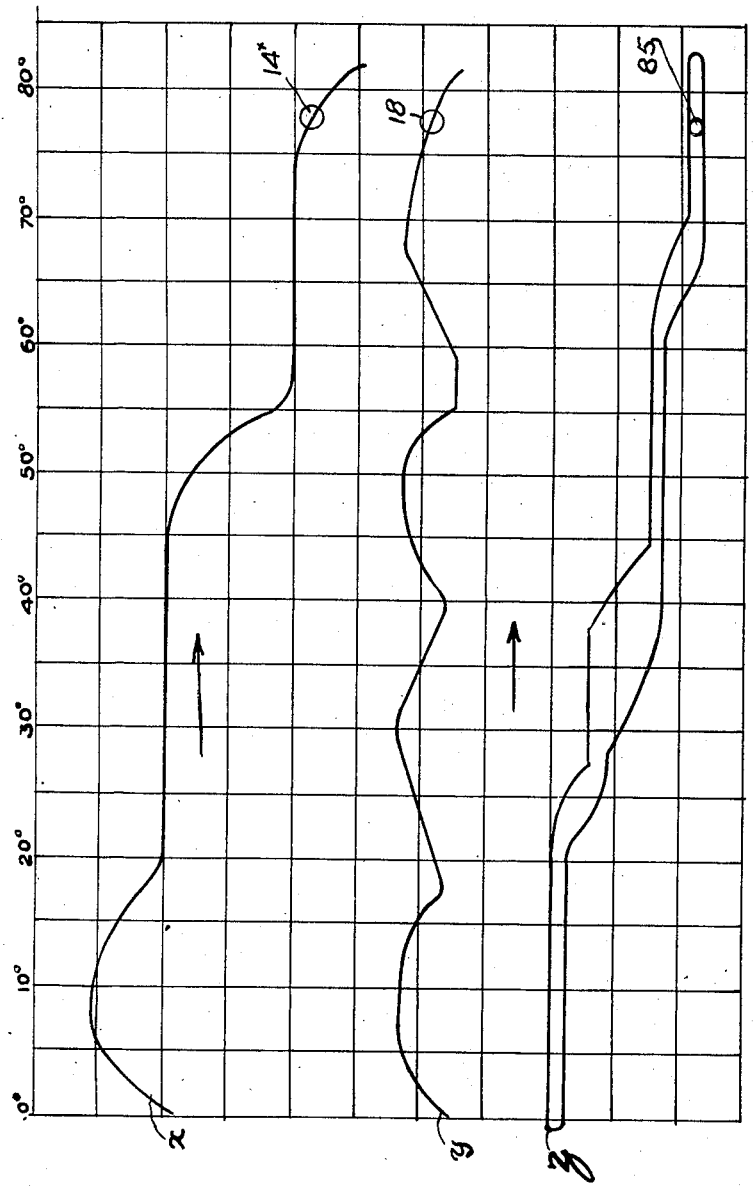

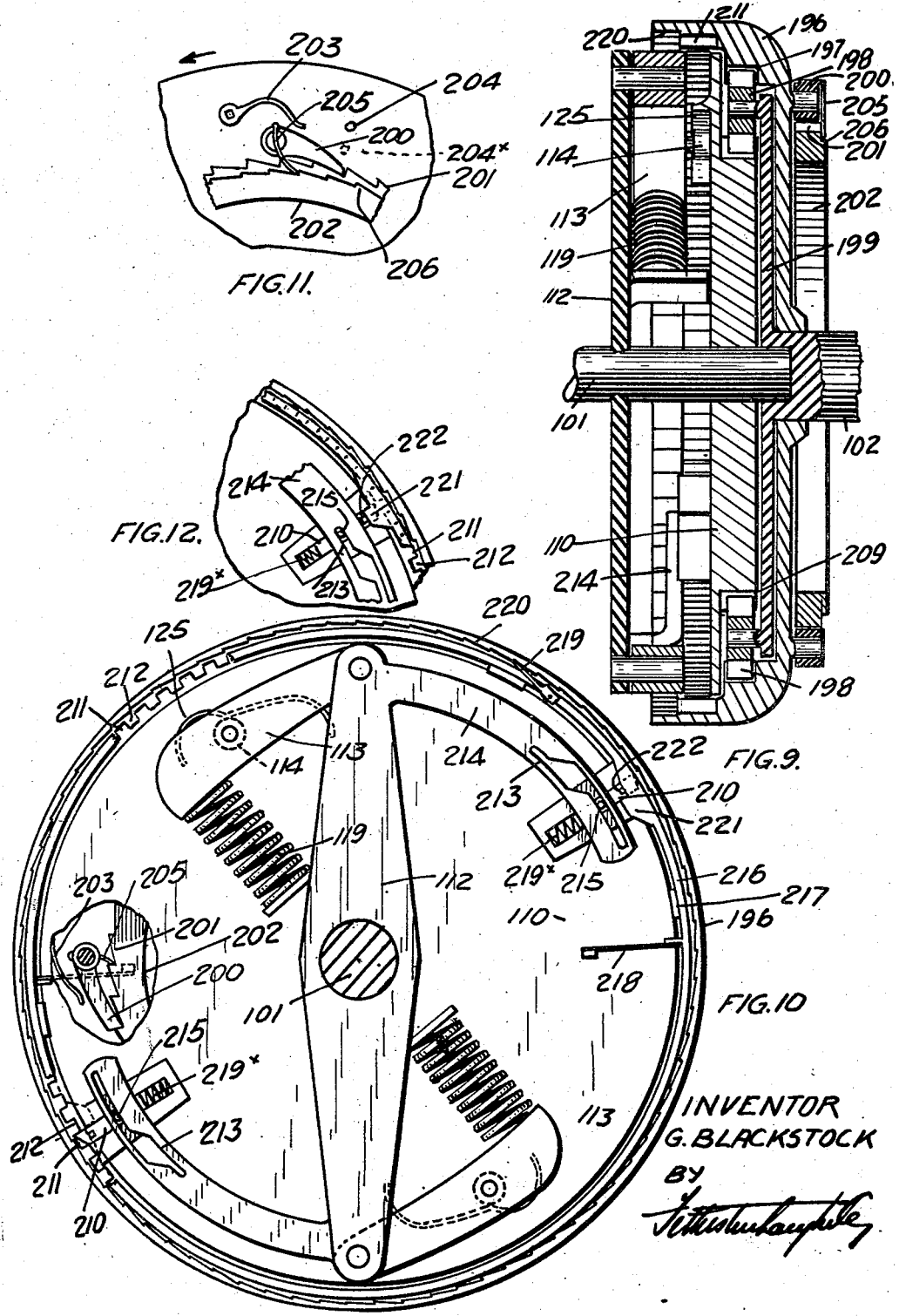

1,877,383

UNITED STATES PATENT OFFICE

GIBBS BLACKSTOCK, OF TORONTO, ONTARIO, CANADA

CHANGE GEAR DEVICE

Application filed February 13, 1930. Serial No. 428,195.

My invention relates to improvements in change gear devices, of the type disclosed in my prior United States Patents No. 1,728,325, dated September 17th, 1929, and No. 1,733,-002, dated October 22nd, 1929, and Canadian Patents No. 281,714, dated July 17th, 1928, and No. 291,650, dated July 30th, 1929, and the object of the invention is to silence and ease the working by elimination of noise, jar and wear of parts. More particularly I provide means whereby the releasable couplings are relieved of noisy slipping contact when disengaged and yet engage promptly at the right time, when a yielding element absorbs any shock or knock, and whereby the engagement or release occurs without any sudden alteration of speed (however small) of heavy parts like the fly-wheel there being at the time no actual load transmitted. These ends are attained by the use of relatively light and silent catch or trigger devices taking the necessary slipping contact and by transmitting the drive through a secondary floating driving member whose angular displacement with respect to some adjacent part effects the changes from one gear train to another. Motion in one direction due to overload and resisted by centrifugal action effects the change to lower gear and opposite motion due to the drag of the throttled engine the change to higher gear. Since spring means are used to control the floating member during changes I have used them for the additional purposes of yieldingly resisting the change to higher gear and for modifying the centrifugal action of the weights, and it consists essentially of the arrangement and construction of parts hereinafter more particularly explained.

Fig. 1 is a longitudinal sectional view through my device.

Fig. 1a shows a detail of the reverse gear.

Fig. 2 is a face elevation of the disc of the floating member and the parts carried by and adjacent to the face thereof.

Fig. 3 is a sectional view on line 3—3, Fig. 1.

Fig. 4 is a detail view of the engaging dog and ratchet employed in my low gear connection, from left of Fig. 1.

Fig. 5 is a detail view showing the intermediate and high speed engaging clutch showing the parts in their normal position, when low gear train is engaged.

Fig. 6 is a similar view to Fig. 5 showing the parts in the intermediate gear position.

Fig. 7 is a similar view to Figs. 5 and 6 showing the parts in the high gear position.

Fig. 8 is a chart or graph showing the corresponding angular position of the parts co-acting with the floating member and arrowed to indicate normal rotation.

Figs. 9 to 12 inclusive illustrate the application of the device to a two speed machine.

Figs. 2, 3, 4, 5, 6, 7, 10, 11 and 12 are arrowed to indicate forward rotation.

In the drawings like characters of reference indicate corresponding parts in each figure.

1 is a drive shaft and 2 a driven shaft bored at $2^x$ to receive the end of the drive shaft 1 and thereby form a bearing for the drive shaft at one end. The shafts 1 and 2 are mounted in stationary bearings 4 and 5. The drive shaft 1 is enlarged at $1^x$ for a purpose which will hereinafter appear.

3 is a counter shaft mounted in bearings 6 and 7 and provided with a low gear member $3^x$ mounted freely thereon, an intermediate gear member $3^o$ secured to the counter shaft and an intermediate or low gear member $3^1$, the intermediate or low gear $3^1$ being slidable longitudinally on the shaft 3 and rotatable therewith. A floating member, comprising a sleeve 8 and disc members $9^x$, $9^o$ and $9^1$ formed integral with the sleeve 8 and rod members 10 connecting the disc members $9^o$ and $9^1$ together, is mounted freely on the driving shaft 1 between the shoulder $1^o$, formed at the end of the enlargement $1^x$, and the hub $87^x$ secured to the shaft 1 and carrying mechanism for actuating the intermediate and high speed clutches hereinafter described.

12 is a cross arm secured to or formed integral with the portion $1^x$ of the driving shaft 1. 13 are weight arms swung at their lighter end upon studs 15 and extending from adjacent each end of the cross arm 12. $14^x$ are rollers whose pins 14 are journalled in the weight arms 13 and preferably provided with anti-friction bearings. 16 are lighter arms swung upon studs 17 also carried by the cross arm 12. 18 are rollers carried by the arms 16.

19 are strong springs carried at one end upon brackets 20 on the arms 12 and bearing at their opposite end against the arms 16 adjacent their free ends forcing the rollers 18 against the curved flanges 29 carried by the disc $9^x$. 21 and 22 are flanges extending from the face of the disc $9^x$ and connected at their ends at 23 and 24 to form curved guideways in which the rollers $14^x$ operate without any noticeable play. The length of the guideway limits the movement of the roller $14^x$ and thereby limits the turning movement of the floating member upon the shaft 1. Each wall 21 is thicker than the wall 22 in order to take the outward thrust of the corresponding roller $14^x$. Owing to the peculiar shape of the flanges 21 and 29 which take the driving thrust of the centrifugal and spring forces behind the rollers $14^x$ and 18 they resist the relative motion of the disc $9^x$ in various positions.

The position of the parts as illustrated in the drawings Figs. 1 to 5 and 8, are as they would appear during operation under very light load, in low gear.

I will now describe the driving connections between the drive shaft through the counter shaft to the driven shaft for producing the low and intermediate drives and direct drive between the drive and driven shaft.

I will first describe the low gear drive connection.

35 is a low speed drive gear secured to or formed integral with the sleeve 8 of the floating member. The gear 35 meshes with the gear $3^x$ freely mounted on the counter shaft 3. 38 are studs extending laterally from the face of the gear $3^x$ towards the disc 46.

In the drawings I have only illustrated one of these studs and the parts coacting therewith. It will, of course, be understood that two or more might be employed as desired.

46 is a disc secured to the counter shaft 3 and provided with an annular flange 45 on its face opposing the gear $3^x$, on the internal periphery of which is formed an annular ratchet $45^x$ and on whose edge is an annular face ratchet $45^o$. 37 is a dog freely mounted on the stud 38 and engaging the ratchet $45^x$ and having a weighted balancing end $37^x$ and a spring finger or pawl $37^o$ extending radially therefrom, such pawl extending outwardly so as to bear laterally against the face of the ratchet $45^o$. The drive is transmitted from the counter shaft by means of the gear $3^1$ meshing with the gear member 52 secured to or formed integral with the driven shaft 2.

The drive shaft 1 and rollers $14^x$ and 18, (which are carried on the drive shaft by means of the cross arm 12 and pivoted arms 13 and 16), when advanced relatively to the floating member cause the rollers to press upon the walls or flanges 21 and 29 where the latter are curved inwardly as indicated at $21^x$ and $29^x$ so that the outward pressure of the rollers due to centrifugal action against these walls exerts a forward thrust on the disc $9^x$. Increase of load on the driven shaft tends to retard the driven shaft rotation and the rotation of the disc $9^x$ by means of the driving connection to the driven shaft hereinafter described.

As the disc $9^x$ is retarded the forward motion of the drive shaft advances the rollers $14^x$ and 18 to a position where the inwardly curved parts $21^x$ and $29^x$ are steeper and the ratio of forward to outward thrust is greater. Similarly decrease of load recedes the rollers $14^x$ and 18.

The gear 35 of the floating member drives the gear $3^x$ which in turn drives the disc 46 secured to the counter shaft by means of the dog 37 and ratchet $45^x$. It will, of course, be understood that when the low gear train is engaged the high and intermediate gear trains hereinafter described are released.

Referring to Fig. 8 which illustrates a graph chart divided vertically and horizontally by lines 10 degrees apart, the graph lines $x$ and $y$ illustrate the paths of the rollers $14^x$ and 18 and their position in relation to the drive shaft, the rollers being shown in the position they occupy when the drive shaft is advanced 77 degrees upon its extreme backward position with respect to the floating member $9^x$. The vertical lines of the chart correspond to the radii of Fig. 2 the downward movement indicated by the longitudinal lines of the chart corresponding to the amount of inward radial movement of the rollers $14^x$ and 18 and in Fig. 2.

If the transmitted load is zero the rollers $14^x$ and 18 tend to take a position where the flanges or walls 21 are concentric with the centre of rotation as indicated between the points A and B, and if load becomes negative, that is if the engine "drags," the inwardly curved part of each flange 29, as indicated between the points $a$ and $b$ in Fig. 2 and from a 68 degree position in Fig. 8, to the left, forces the disc $9^x$ and floating member to be held to the speed of the drive shaft and slow down with the engine.

When the rollers $14^x$ and 18 recede by moving to the left to the 68 degree position in Fig. 8 and begin to exert a backward pull on the floating member, the engaging end of the dog 37 is carried away from the short face of the tooth of the rack 45ˣ and pushed inward by the long face thereby freeing the balanced dog completely clear of the ratchet against the stud 48.

The spring pawl or finger 37° is also carried out by centrifugal action and the rubbing of the fine rack 45° aiding in the releasing operation and holding the dog clear of the ratchet teeth. It will thus be seen that the disengaging operation of the dog 37 is affected without any slipping contact with the face of the ratchet 45ˣ resulting in clatter, thus making the operation noiseless. When the gear 3ˣ, and the dog 37 carried thereby, again overtakes the revolving disc 46 the spring pawl 37° is caught by the ratchet 45° and swings the engaging end of the dog again into immediate engagement with the ratchet 45ˣ. If there is any power behind the drive shaft at the time the dog 37 engages the rack the inward curves at the forward ends of the walls 21 and 29 cushion the shock preventing its transmission thereby eliminating the noise. In any case the shock would not be great as the engagement takes place practically on synchronization of the rotating parts.

It will thus be seen that the light pawl and rack 37° and 45° take the slipping contact instead of the relatively heavy dog 37. The spring pawl 37° may be made exceedingly light and flexible if the dog is well balanced. The stop pin 48 limits the swing of the dog 37 from the rack 45ˣ.

I will now describe the intermediate gear connection and its operation.

65 is a ring provided with short, well fitting sleeves 66 slidable upon the rods 10 so as to have axial movement in relation to the driving shaft between the members 9° and 9¹. The ring 65 is provided with a number of teeth 67 forming an exterior rack. 75 is the intermediate speed drive gear which is mounted freely upon the sleeve 8 of the floating member and meshes with the gear 3° of the counter shaft 3.

52 is an intermediate drive gear secured to or formed integral with the driven shaft 2 and meshing with the gear 3¹ of the counter shaft 3. 75ˣ is a disc or spoke member carried by the gear 75 and 52ˣ is a disc or spoke member carried by the gear 52. The parts 75ˣ and 52ˣ carry annular flanges 75° and 52° which are concentric with the driving shaft 1 and respectively carry teeth 68 and 93 which form annular internal racks in horizontal or axial alignment with the teeth 67 of the exterior rack of the ring 65.

The teeth 67 act as splines fitting either between the teeth 68 or 93, when the ring 65 is moved in an axial direction. When the teeth 67 engage between the teeth 68 the drive is transmitted from the floating member, of which the disc 9°, rods 10, ring 65 and teeth 67 form a part, to the teeth 68, flange 75° and gear 75 to gear 3° secured to the counter shaft 3 and from thence by gear 3¹ to the gear 52 secured to the driven shaft.

In Fig. 5 the teeth 67, 68 and 93 are shown in the low gear position. In Fig. 6 the teeth 67 are moved into engaging position with the teeth 68 to form the intermediate drive. The driving teeth 67 travel faster than the driven teeth 68 when low gear is engaged.

81 and 82 are spring fingers secured to ring 65. The position and shape of the teeth 81 and 82 are clearly illustrated in Figs. 3, 5, 6 and 7, and also the shape of the teeth 68 and 67 which, as shown, give a ratchet formation.

In Fig. 5 the spring fingers 82 slip over the adjacent faces of the teeth 68 when the fingers 82 have a relative travel in the forward direction and engage when travelling in the opposite direction or when overtaken by teeth 68, if originally in the low gear position, and the fingers 81 when they have a relative travel in a rearward direction in the neutral position or between the intermediate and high gear teeth 68 and 93 respectively.

To change to intermediate gear:

If the engine is deliberately throttled the rollers 14 and 18 tend to take a position about 68° to 70° in Fig. 8, the dog 37 is released as hereinbefore described, and the floating member loses speed together with the drive shaft.

When the speed of the rollers 18 and of the ring 65 falls to that of the teeth 68 by travelling relatively backward the spring pawls 82 each catch the forward face of a tooth 68, owing to the ratchet like set of each tooth in relation to the next adjacent tooth, so that the floating member of which the ring 65 forms a part is held to the speed of the second gear members 75, 75ˣ and 75°, and 68 while the drive shaft tends to lag behind.

The drag of the engine now causes the rollers 18 to travel backward on the flange or wall 29 beyond the 68° position (see Fig. 8), if it is great enough to effect the necessary compression of the spring 19. The relative displacement of the floating member with respect to the drive shaft then actuates means for moving the teeth 67 axially and into engagement with the teeth 68 in the following manner.

On the inner face of the ring 65 are several short studs 85. 87 is a drum carried by the hub 87ˣ secured to the driving shaft 1. The periphery of the drum 87 is provided with specially shaped slots 86.

Relative motion of the drum forces the studs 85 and thus the teeth 67 to the right (Fig. 5) into mesh with the teeth 68, the latter being held in position by the springs 82, the parts assuming the position shown in Fig. 6.

In Figs. 5 to 7 the actual shape of the slot 86 is shown, but in Fig. 8 it is shown reversed at $z$ because the slot moves with the drive shaft and with the rollers $14^x$ and 18, and reversing the diagram makes the stud 85 appear to travel with the rollers thus simplifying the reading of the chart.

The second or intermediate gear train is now completed, the drive shaft and rollers having receded to the 60° position from whence they immediately pass on toward the 40° position. The rollers $14^x$ and 18 and weights 13 move out as they pass to the 45° position and the centrifugal and spring forces acting on the curved flanges 21 and 29 momentarily turn the drag into a strong forward thrust hence the need for the absence of play between the teeth.

If the throttling is continued the drive will pass on to the high gear connection in an analogous manner, but if the throttle is reopened the forward thrust will be taken by the inwardly curved driving flanges 21 and 29 between the 50° and 55° positions (see Fig. 8), the exact position depending upon the relation between load and outward forces, the latter depending in turn on the speed. As before the floating member acts as a secondary driving member.

In changing back from intermediate to low gear:

When the load becomes great enough, as by opening the throttle or by decrease of speed and consequent decrease of centrifugal force, the driving rollers $14^x$ and 18 are forced inward past the steepest points on the driving flanges 21 and 29 at about 55°, and move forward toward the 80° position.

The engine races, accelerating rapidly, and the studs 85 are caught by the flange slots 86 and forced to the front or drive shaft end, that is down in the chart, Fig. 8, and to the left in Figs. 1 and 5 so that the ring 65 and teeth 67 are moved clear of the teeth 68.

The chart shows that while the teeth are being cleared there is no load being transmitted i. e. roller $14^x$ moving concentrically, which saves much wear on the connection. The engine quickly attains the speed corresponding to low gear operation, the acceleration being transmitted to the floating member by the outward pressure of the rollers on the inwardly curved flanges 21 and 29, and when the dogs 37, driven from the floating member, overtake the rack 45 they engage in the manner previously described. The rollers and driving flanges act as a cushioning device to prevent the transmission of shock.

The change from second or intermediate to high gear takes place in the following manner.

Suppose the second or intermediate gear connection to be taking the drive and the rollers $14^x$ and 18 to be between the 50° and 55° positions. If the engine is throttled only slightly the rollers will recede and the roller 18 will be caught by the inward turn of the flange 29 at between the 45° and 40° positions, and if the drag is not great the drive shaft and engine will thus be "driven." This prevents the inconvenient and unnecessary release of the second gear connection every time the throttle is slightly eased in slow traffic.

However if the throttling is deliberate and pronounced, the greater drag of the engine causes the rollers 18 to be carried over the inwardly projecting part of the flanges 29 at 40°, the drive shaft and rollers $14^x$ and 18 thus being able to recede farther without resistance.

As they pass the 30° position by a degree or so the studs 85 on the ring 65 actuated by the slot 86 force the ring to the rear (upward in Fig. 8, to the right in Fig. 1), the teeth 67 being clear of the teeth 68 and between the latter and similar teeth 93 carried on the flanged extension 94 of the driven shaft gear disc 53.

It can be seen from the chart (see Fig. 8), that the rollers 18 tend to stay near the 30° position owing to the shape of the flange 29 and the floating member now free from any gear train shares the speed of the drive shaft. The speed of the ring 65 and teeth 67 is now less than that of the teeth 68 and greater than that of the teeth 93, the spring fingers 81 and 82 both slipping.

If the throttle is reopened too soon the second gear will re-engage by the springs 81 catching the teeth 68 and holding the floating member to the member 75 while the advance of drive shaft and slot 86 causes the stud 85, ring 65 and teeth 67 to move to the front or to the left into mesh with the teeth 68, the rollers $14^x$ and 18 transmitting the drive again when they come to the inward curves of the flanges between the 50° and 55° positions.

If the throttling is continued instead, the rollers $14^x$ and 18 being at about the 30° position, until the speed of the rack 67 falls to that of the driven shaft and rack 93, the high gear connection will engage.

The high gear is formed when the speed of the ring 65 falls to the speed of the teeth 93, the spring fingers 82 are caught by the teeth 93 and the floating member thus held to the speed of the driven shaft while the drive shaft falls behind.

The rollers $14^x$ and 18 recede farther and the studs 85 on the ring 65 are forced to the rear so that the teeth 67 are in mesh with those teeth 93 before the rollers pass the 20° position and move outward, which as has been explained, causes a strong momentary reversal of thrust.

When the throttle is reopened after the rollers have been moved into the bowed parts of the flanges 21 and 29, at their backward or left hand ends, the drive is resumed in high gear; the necessary forward thrust is obtained by the outward pressure of the driving rollers on the inwardly curved flanges 21 and 29 between the 10° and 16° positions.

The release of the high gear connection by overload is just like that of the intermediate gear connection. When the load becomes excessive the rollers are forced inward and onward past the steepest parts of the flanges 21 and 29 at about the 16° or 17° positions and the ensuing displacement of the drive shaft causes the slot 86 acting on the studs 85 to withdraw the ring and teeth 67. The engine then races and the necessary acceleration is imparted to the floating member by the rollers 18 pressing on the flanges 29 which are turned inward between the 30° and 40° positions. As soon as the ring 65 overtakes the teeth 68 the spring fingers 81 are caught by the latter and the teeth 67 forced into mesh as described hereinbefore.

The greater steepness and deepness of the inward curves of the flanges 21 and 29 between the 50° and 55° positions, as compared with the 10° to 16° positions, serves to absorb any shock and also renders the change from second to low gear more difficult (requiring greater load) than the release of the high gear connection, it is to be noted that this effect is greatly augmented by the fact that the drive shaft during the change has doubled its speed relatively to the driven shaft.

The steepness of the inward inclination of the flange 29 and roller path $y$ between 30° and 40°, and the strength of the springs 19 are to be made sufficient to enable the rollers 18 to give the necessary acceleration to the floating member, so that the rollers will not advance past the 40° position (where as the shape of the slot 86 shows the teeth 67 would be forced against the teeth 68, the downward motion of the stud 85 in the chart corresponding to motion of the teeth 67 to the left in Fig. 1) until the speed of the teeth 68 is reached. Should this happen, however, no real harm would result, the teeth 67 would merely press for an instant against those 68 while the latter are going faster, owing to the shape of the teeth no premature engagement would result. In order to be easily accelerated the floating member is made as light as is consistent with strength, the less its moment of inertia the lighter and fewer need be the spring fingers 81 and 82 and consequently the more silent in operation.

It is to be noted that the spring fingers 81 and 82 have slipping contact only when the gear change is in progress, or when the low gear train is in operation at which time there is always some noise from the gears. Any noise they may make is of an entirely different order from that which would be made by slipping of teeth like 67 or dogs 37 etc., heavy enough to take the drive. They are only comparatively light springs strong enough to catch the light floating member and have nothing whatever to do with transmission of the drive itself. They may be secured to the ring 65 with interposed layers of some sound-deadening material.

The trigger pawl 37° of the dog 37 may be lighter still since its only requirement is to turn a well balanced dog through a few degrees.

I will now describe a two speed machine having the same silent action as set forth in connection with my three speed machine.

This is illustrated in Figs. 9–12, and is essentially a planetary gear unit corresponding in general type to my United States Patent No. 1,728,325 and Canadian Patent No. 281,714, with releasable means for locking the reaction gear ring member to the drive shaft or to the stationary part.

101 is the drive shaft, 102 the driven shaft, 196 is the reaction member carrying the reaction ring gear 197 which meshes with the planet gears 198 carried on the disc or arms 199 secured to the driven shaft.

The reaction lock consists chiefly of the dogs 200 on the disc 196 and the ratchet rack 201 on the fixed ring 202 which may be secured in any manner. A very light pawl in the form of a bent spring 205 is attached to the dog near its pivot and engages the fine rack 206 integral with the ring 202.

When the drive shaft 101 in such a planetary system is slowed the reaction member 196 must begin to revolve forward, owing to the action of the planet gears, so the dog 200 disengages. It is immediately prevented from slipping on the teeth by the bent spring pawl 205 slipping over its rack 206, and when even a quite low speed is reached centrifugal force lifts the dog clear against the spring 203 to the stud 204 so that there is not even the lightest kind of slipping contact.

When, as is explained below, the direct drive is released and the engine races forcing the reaction member back to zero speed and tending to drive it backward, the spring 203 presses the dog inward as the centrifugal action becomes low far enough to bring the spring pawl 205 but not the dog 200 into slipping contact. As soon as the least reverse motion begins the pawl trips the dog into engagement.

The spring 203 may be dispensed with and the stud 204 moved into the position 204$^x$, in which case the spring pawl 205, which may be very light, will slip until a high speed is reached when its own centrifugal force may lift it clear. The device is a dog and ratchet in which slipping contact, necessary only just before engagement and ceasing shortly after, is kept by a relatively silent trigger pawl.

The direct drive connection is in principle the same as the other machine hereinbefore described.

Cross arms 112 secured to the drive shaft carry the weights 113 and the rollers 114 bear on driving flanges 125. These are secured to a disc 110 corresponding to the floating member of the other previously described machine, the springs 119 act directly on the weights. The driving gear 209 on the disc 110 engages the planet gears 198.

Sliding spring pressed keys 210 in thick walled slots in the disc 110 engage teeth and notches 212 and 211 on the reaction member 196, and the rollers 114 pressing on the inwardly curved part of the flanges 125 transmit the drive from the drive shaft. Thus all moving parts are locked together, since the planet gears 198 are held between the gears 209 and 197, the keys 210 will be free as indicated by dotted lines in Fig. 12.

When the load becomes excessive the roller 114 is forced inward against centrifugal and spring forces and can advance along the concentric part of the flange 125, while the engine commences to race. The advance of the drive shaft carries the arm 214 secured to the cross arm 112 forward so that the slot 213 catches the stud 215 on the key 210 and withdraws it from the notch 211 thus breaking the direct drive connection.

The rollers now press against the inwardly curved ends of the flanges 125 driving the disc 110 forward with the drive shaft. The ring 216 on the brackets 217 on the disc 110 is now pressed backward a few degrees by the spring 218 on the disc, since the pawl 219 on the ring is no longer caught by the rack 220 on the reaction member 196. The pawl 219 being light and pressed by a weak spring 219ˣ coiled about its pin slips noiselessly over the fine rack, and the lug or projection 221 on the ring moves outside the stud 222 on the key 210, now drawn in.

The positive acceleration of the disc 110 and gear 209 produces negative acceleration of the gear 199 and reaction member which quickly comes to rest and is held by the dog 200 as described above. Here as before the inwardly curved end of the driving flange 125 prevents any shock on engagement.

The change to high gear is effected as usual by throttling the engine.

The relative backward motion of the drive shaft and arms 112 and 214 causes the inner wall of the slot 213 to press outward on the key stud, the key cannot move out since the stud 222 is caught by the lug 221 on the ring, so the disc 110 on which the key is carried has a backward pull, which acting through the gears 209, 198 and 199 causes positive acceleration of the reaction member 196 and this frees the dogs 200 as explained before. Meanwhile the rollers 114 are held from receding as far as the bowed portions of the flanges 125 at their backward ends.

When the reaction member 196 reaches the speed of the drive shaft 101 and disc 110 the rack 220 gives the pawl 219 and ring 216 a forward kick, the lug 221 moving away from the stud 222 so that the key 210 is shot out to catch a tooth 212, the reaction member 196 and disc 110 are thus locked while the drive shaft carries the rollers 114 backward and the slot 213 moving with them forces the key into full engagement before the rollers move out into the bowed portions of the flanges 125. This completion of engagement before the rollers move out is advisable in view of the strong reversal of thrust which has been previously explained to occur here. When the throttle is re-opened the drive is taken by the direct drive connection again.

As there should always be more than one key 210, one of them may be shown with the backward face longer than the forward one, to take the first catch as the teeth 212 overtake it, and the others with the forward face longer to slip into position when the first one catches.

Such a machine is adapted to form part of the gear system of a car in conjunction with manually operated gears, including a reverse and, optionally, two forward speeds, or to be fitted to the rear of the ordinary gear box of a car where the small axial length, as indicated in Fig. 9 can be accommodated.

In the former case the automatic gears are placed in front of the others so that they need not reverse. If the main clutch is reasonably flexible the hand lever may be set in high speed position for starting and left there for practically all driving.

If the device is fitted to the rear of the gear box it must be able to reverse. When the driven shaft begins to revolve backward the direct drive will engage in the usual way owing to the relative backward motion of drive shaft and disc 110 with respect to the reaction member, the reversing and reduction being done in the ordinary gear box. Either the dogs 200 must be releasable by manual means or the "fixed" ring 202 must be allowed to revolve backward. The latter is the simpler as the ring can easily be mounted on any suitable kind of bearing and normally held by keys, splines etc., releasable by manual means when the reverse gear is let in.

Using the two machines, hereinbefore described, as illustrations I have shown how the release and engagement of the locking members, whether by radial or axial movement, is actuated without the necessity for noisy slipping contact, such contact being preserved by relatively silent trigger devices, such as light pawls, springs etc. It has been shown how the release and engagement are conveniently operated by overload and drag acting by the angular displacement of a secondary floating driving member which is also adapted to form a yielding element in the transmission preventing shock when the weights fly outward or when the drive is taken up by a new gear train, and how this floating member is controlled by the interaction of spring and centrifugal forces with those of load and drag.

The use of spring force is largely optional, but its value to the designer for modifying centrifugal action can be shown by a simple example. Suppose the engine can exert a maximum torque of 100 ft. pds. at 14 miles per hour in high gear, and that this torque is just sufficient to enforce the change to second gear at this speed—the critical load or torque.

If weights alone are used the critical torque at half this speed, 7 miles per hour, will be 25, since centrifugal force decreases as the square of the speed, and the maximum torque of the engine will fall to say 75, then the release of the high gear at 7 miles per hour will require one third of the full engine power.

If the weights are supplemented by springs, and the inclination of the flanges 29 at the steepest point, at about the 16° position, and strength of springs such that they transmit a torque of 20 ft. pds. while the weights are reduced in size so that they transmit 80 instead of 100 ft. pds. at 14 miles per hour. Then the total critical load at 14 miles per hour is the same as before. At 7 miles per hour the effect of the springs is the same and that of the weights reduced to one quarter, i. e. at 20, the total critical load is 20 plus 20 or 40 in place of the 25 when weights alone are used, so that more than half instead of a third of the power of the engine is required.

This example shows how the resistance can be increased at low speeds, thus making the change to lower gear less likely and frequent and easy, without increasing it at higher speeds. Though 100 ft. pds. is a rather low torque for an engine it can be seen that great springs are not required. The springs are preferably made only strong enough to prevent the change from high to second gear at low speeds until the throttle is deliberately opened for acceleration, too great strength might cause undue wear on the clutch since it is sometimes necessary to release the high gear connection on starting. The spring force actually increases slightly with speed if the springs press outward, it will decrease slightly if they act inward and not at all if they act axially.

The use of spring force to control the floating member during acceleration makes the working of the machine much smoother and its use to resist the release of the second gear connection by drag prevents the continual release and reengagement while in very slow traffic, the release occurring only on definite drag due to deliberate throttling. The low gear couplings of both machines are very much simpler and less liable to wear so they are not fitted with this device.

The two machines shown do not illustrate all the possible general designs or types of gear train nor all the positions which the releasable connections may occupy, but it has been shown that keys etc., may be worked with radial or axial movement, and there are well known ways of converting rotary motion (like displacement of the floating member) to axial motion and vice versa, so the positions of the keys are not limited except for reasons of constructional simplicity. All possible kinds of locking member have not been illustrated, but any kind, in order to lock and release another revolving part, must have axial or radial movement.

With reference to the floating member it may be pointed out that its action is due to its motion relative to some adjacent part, and not to its special position in Fig. 1. By carrying it on the drive shaft and the weights on the latter only one floating member and set of weights are needed, furthermore since the drive shaft approximately doubles its speed after the release of the high gear connection the weights have greatly increased resistance to hold the second gear in engagement when it picks up the drive (it is for this reason too that the inward turn of the flange 21 at the second gear position is made steeper and deeper than at the high gear position).

The positions of floating member, weights and springs and releasable connections are determined by consideration of practical convenience, not fixed by the principles involved.

The machines are designed to relieve the driver of all claims on his attention in the matter of gear changing and to preserve the transmission from wear and tear, for the first object the dimensions are chosen so that the changes will occur just when a good driver would wish to change and for the second object the machine is properly balanced, and as is indicated by the chart, the release and engagement of keys etc., occur at an instant when there is practically no load being transmitted.

The number of possible constructions is too large for me to indicate them all here and while the general principles could be illustrated with reference to the three speed machine alone I have shown the planetary unit as well chiefly to show the independence of principles from construction and because the latter illustrates a compact form of the device adapted to be added as an accessory to an ordinary car. Furthermore it can be seen from Figs. 3 and 10 that the exact mechanism of the catch or trigger device is not of great importance as long as it is reasonably silent—in Fig. 3 the light pawls do the catching themselves and in Fig. 10 they release the keys to do the catching; the point common to these two and the dogs in Figs. 4 and 11 is that relatively light silent devices instead of the heavy driving members preserve the slipping contact necessary to effect the engagement at the right time.

What I claim as my invention is:

1. In a change gear device of the type described, the combination with the drive and driven shaft, and a plurality of gear trains therebetween each having a releasable link with interengaging locking members, of a controlling device comprising two adjacent parts of the transmission having some mutual angular freedom of movement and a resilient driving connection between them, weights subject to centrifugal force and inward force due to load incorporated in the driving connection, mechanism by which the controlling device actuated by inward movement of the weights due to load operates the change from a higher to a lower gear train and by backward drag on the drive shaft operates the opposite gear change and whereby the load is gradually exerted after a gear train has been closed and not exerted or transmitted during the opening or closing of a gear train, and catch devices carried between the related locking members to actuate their engagement on synchronization.

2. In a change gear device of the type described, the combination with the drive and driven shaft and a plurality of gear trains therebetween each having a releasable link with interengaging locking members, of a transmission mechanism between the drive shaft and said gear trains, a controlling device and a driving device incorporated in the transmission the controlling device comprising adjacent parts thereof having some mutual angular freedom of movement and the driving device comprising a driving member in the transmission including weights carried thereby so as to be subject to centrifugal force and inward force due to load, a driven member in the transmission with which the weights have driving engagement, engageable means for connecting any one train to the drive shaft mechanism coacting with the controlling device for positioning such means for engagement when actuated by inward movement of the weights due to load to change the drive from a higher to a lower gear train and when actuated by backward drag on the drive shaft to change from a lower to a higher gear train, both of the aforesaid drive changing mechanisms being adapted to run idle during the changing operation and to gradually pick up the load after the change is made, and a catch device carried by said engageable means to effect their engagement upon synchronization.

3. In a change gear device of the type described, the combination with the drive and driven shaft, a plurality of gear trains therebetween and a transmission between the drive shaft and the gear trains such transmission including a driving member, weights so carried thereon as to be subject to centrifugal force and inward force due to load, and a driven member with which the weights engage, of releasable interengaging members in each gear train to close the gear train when engaged, means for releasing said members to open the gear train, means for holding the members apart when disengaged, and a catch device between the two members adapted to actuate their engagement upon synchronization.

4. In a change gear device of the type described, the combination with a drive and driven shaft and a plurality of gear trains therebetween, of a dog clutch in each train having relatively strong and heavy locking members, of a relatively light and noiseless spring finger device adapted to relieve the locking members of slipping contact when disengaged and to actuate their engagement upon synchronization.

5. In a change gear device of the type described, the combination with the drive and driven shaft and a plurality of gear trains therebetween, of a secondary floating driving member, and an adjacent member forming part of the transmission normally revolving together but free to have angular movement, a resilient driving connection between the members including weights carried thereby and subject to centrifugal force and inward force due to load, means actuated by relative motion of the floating member in one direction due to inward motion of the weights by overload for changing the drive from a higher to a lower gear train and by motion in the opposite sense due to drag on the drive shaft for changing from the lower to a higher gear.

6. In a change gear device of the type described, the combination with the drive and driven shaft and a plurality of releasable gear trains therebetween, of a transmission between the drive and driven members, an adjacent driving and floating member in the transmission and a driving connection therebetween including cam surfaced portions on one member and resilient pressure members carried on the other driving member to engage and move over the cam surfaces as the said adjacent members undergo relative angular displacement, mechanism by which such displacement in one direction due to overload effects the change of drive from a higher to a lower gear train and in the opposite direction due to backward drag on the drive shaft effects the change from a lower to a higher gear, said cam surfaces being so shaped as to transmit the drive and gradually exert the load only when a gear train is closed.

7. In a change gear device of the type described, the combination with a drive and driven shaft, a plurality of driven gear trains therebetween, a transmission between the driven shaft and gear trains, weights incorporated in the transmission and subject to centrifugal action and inward force due to load, and mechanism by which the counteraction of the centrifugal force by the aforesaid inward force actuates the change from a higher to a lower gear, of springs incorporated in the transmission and adapted to reinforce the centrifugal action of the weights.

8. In a change gear device of the type described, the combination with the drive and driven shaft, a plurality of gear trains therebetween, revolving weights incorporated in the transmission, and mechanism actuated by inward movement of the weights due to overload counteracting centrifugal force of the weights for changing the drive from a higher to a lower gear train, of means acuated by backward drag on the drive shaft for changing the drive from a lower to a higher gear train, and springs incorporated in the transmission adapted to yieldingly resist the change to higher gear.

9. In a change gear device of the type described, the combination with the drive and driven shaft and a plurality of releasable gear trains therebetween, of a clutch in the low gear train provided with interengaging dog and ratchet members, a spring finger carried on one of said members and a fine ratchet rack coacting with the finger carried on the other of said members, the finger and coacting rack being adapted to hold the dog and ratchet members clear when disengaged and to actuate their immediate engagement upon synchronization.

10. In a change gear device of the type described, the combination with the drive and driven shafts low, intermediate and high gear trains therebetween, a transmission between the drive shaft and gear trains, of a dog clutch in the intermediate gear train having interengaging clutch members to transmit power when engaged, revolving weights carried in the transmission to be subject to centrifugal force and to inward force due to load, means coacting with the inward movement of the weights due to overload for releasing the clutch to allow of increasing speed of the drive shaft and to backward drag on the drive shaft for releasing the clutch to allow decreasing speed of the drive shaft, a spring finger device carried between the interengaging members to actuate their engagement when either one overtakes the other, and means for holding the members clear of each other when disengaged.

11. In a change gear device of the type described, the combination with the drive and driven shaft and the high and low gear trains therebetween, of a dog clutch in the high gear train having interengaging members to transmit the drive when engaged, weights incorporated in the transmission and subject to centrifugal force and to inward force due to load, means acuated by inward movement of the weights due to load for releasing the clutch, means for holding the interengaging members apart when released, and a spring finger device for actuating their engagement when they are synchronized.

12. In a change gear device of the type described, the combination with the drive and driven shafts and a plurality of gear trains therebetween, of a clutch mechanism completing each gear train each clutch mechanism comprising an engaging driving member and an engaged driven member adapted to be disengaged to rotate at different speeds, means for releasing said members to open the gear train, means for holding the members apart when disengaged, and a catch device between the members adapted to actuate their engagement upon synchronization.

13. In a change gear device of the type described, the combination with a drive and driven shaft, and a plurality of open releasable gear trains therebetween, of a closing clutch in each train, each clutch comprising opposing interengaging members and a spring finger device carried by one interengaging member coacting with the other interengaging member to prevent direct slipping contact between the engaging and engaged members when disengaged and rotating at different speeds, and to ensure engagement when such members synchronize.

14. In a change gear device of the type described, the combination with a drive and driven shaft, and a plurality of open releasable gear trains therebetween, of a closing clutch in each train, each clutch comprising opposing engaging and engaged members forming an annular ratchet formation, and a spring finger device carried by the engaging member and adapted to have wiping or slipping contact with the engaged member when rotating in the disengaged position and to ensure the engaged member being directly aligned for engagement, and means actuated by change of speed ratio between the drive and driven shafts for carrying the engaging members to the disengaged position and by synchronization of speed to the engaged position.

15. In a change gear device of the type described, the combination with a drive and driven shaft and a plurality of open gear trains therebetween, of a floating member mounted on the drive shaft, a ring having a toothed external periphery mounted on the floating member and movable longitudinally of the drive shaft, a member having an internal toothed periphery connected to a member of one gear train, a similar member connected to the driven shaft, means for aligning the teeth of the longitudinally movable member with interspaces between the teeth of the other members, means operated by the retarding of the drive shaft for moving the ring teeth into meshing position with one of the internally toothed members, and means operated by the advance of the drive shaft for moving the ring teeth into mesh with the other internally toothed member, and a driving connection between the drive shaft and floating member.

16. In a change gear device of the type described, the combination with the drive and driven shafts and a transmission therebetween comprising a plurality of gear trains of different gear ratios and a closing clutch in each train, of a floating member and a coacting adjacent driving member incorporated in the transmission and driven from the drive shaft and mounted on the same axis to have relative turning movement with the floating member and through which the floating member is connected to the drive shaft, means actuated by the relative backward movement of the floating member to the driving member when subject to driven shaft overload for opening a previously engaged higher gear clutch and then closing the lower gear clutch, and means actuated by relative turning movement of the floating member in the opposite direction when subject to engine drag on the driving shaft for opening a previously engaged lower gear clutch and then closing a higher gear clutch.

17. In a change gear device of the type described, the combination with the drive and driven shafts and a transmission therebetween comprising a plurality of gear trains of different gear ratios, of a floating member having an interchangeable driving connection with the gear trains and so incorporated in the transmission as to turn in one direction when the transmission is subject to drive shaft drag and in the opposite direction when subject to drive shaft overload, clutches forming driving connections between the floating member and each train and carried into and out of their clutch engaging conditions by the aforesaid movement of the floating member, engageable portions carried by the floating member and arranged circumferentially, a driving member driven from the drive shaft and including a weight movable radially and adapted to engage at its free end in one of the engageable portions of the floating member selected by the amount of drive shaft drag or overload.

18. In a change gear device of the type described, the combination with the drive and driven shafts and a transmission therebetween comprising a plurality of gear trains of different gear ratios, of a floating member incorporated in the transmission and a coacting adjacent driving member driven from the drive shaft and adapted to engage the floating member at a plurality of driving positions, a position corresponding to each gear train, spring means for reinforcing the driving connection between the driving and floating members, clutch mechanism in each gear train, and means actuated by the movement of the floating member for automatically opening the previously engaged clutch and then closing another of the aforesaid clutch mechanisms in a gear train corresponding to the driving position assumed by the floating member when subject to engine drag or overload.

19. In a change gear device of the type described, the combination with a drive and driven shaft and a plurality of gear trains therebetween, clutch mechanisms incorporated in each gear train, of a floating member turnably carried by the drive shaft and having limited angular freedom of movement, curved driving flanges extending from the floating member and so formed as to receive a driving thrust at a plurality of positions spaced throughout the length of each flange, a driving means carried by the drive shaft, means on the driving member actuated centrifugally and by spring pressure for engaging the flanges to move over the surface of the same as the floating member and drive shaft undergo relative displacement and exert thrust when engaging the flange at any of the aforesaid driving positions, means actuated as the driving member passes from one driving position to another for releasing one clutch and engaging another.

20. In a change gear device of the type described, the combination with a drive and driven shaft and a plurality of gear trains therebetween, clutch mechanism incorporated in each gear train, of a floating member turnably carried by the drive shaft and having limited angular freedom of movement, resilient pressure members on the drive shaft, a pair of curved driving flanges extending from the floating member and so formed as to receive a driving thrust from the pressure members at a plurality of positions throughout the length of each flange and so formed that the driving thrust is gradually exerted as the driving member approaches the driving position to pick up the load gradually, and driving means between the floating member and gear trains.

21. In a change gear device of the type described, the combination with a drive and driven shaft and a transmission comprising a plurality of gear trains adapted to be opened and closed, of a driving member mounted on the drive shaft, a floating member mounted to turn around a given centre, means operated by the turning of the floating member for opening and closing the gear trains, flanges extending from the floating member with which the driving member engages and so formed as to transmit load from the drive to the driven shafts when any one gear train is closed and to cease to transmit during the change from one gear train to another.

22. In a change gear device of the type described, the combination with a drive and driven shaft and a transmission comprising a plurality of gear trains adapted to be opened and closed, of a resilient pressure member mounted on the drive shaft, a floating member mounted to turn around a given centre, means operated by the turning of the floating member for opening and closing the gear trains, flanges extending from the floating member with which the resilient pressure member engages and so formed as to transmit load from the drive to the driven shaft when any one gear train is closed and to cease to transmit during the change from one gear train to another.

23. In a device of the class described, the combination with the low gear train, a drive and driven shaft, of a clutch incorporated in said train and comprising a gear train member connected to the driving shaft, an annular ratchet, a coacting balanced dog carried by a gear train member driven from the drive shaft, and means adapted to prevent slipping contact when the dog is disengaged and the clutch members are travelling at different speeds and to effect immediate engagement when the aforesaid clutch members are synchronized.

24. In a device of the class described, the combination with the low gear train, a drive and driven shaft, of a clutch incorporated in said train and comprising a gear train member connected to the driving shaft, an annular ratchet, a coacting balanced dog carried by a gear train member driven from the drive shaft, a supplemental ratchet also carried on the train member connected to the driven shaft, and a pawl coacting therewith and with the dog to hold the dog out of slipping contact with the ratchet when disengaged as the clutch members travel at different speeds to effect immediate engagement when the clutch members are synchronized.

25. In a device of the class described, the combination with the low gear train, a drive and driven shaft, of a clutch incorporated in said train and comprising a gear train member connected to the driving shaft, an annular ratchet, a coacting balanced dog carried by a gear train member driven from the drive shaft, a supplemental ratchet also carried on the train member connected to the driven shaft, a light finger extending radially from the dog into the path of the supplemental ratchet to hold the dog out of slipping contact when freed as the clutch members travel at different speeds and to be engaged by the supplemental ratchet to effect immediate engagement of the dog when the clutch members are synchronized.

26. In a change gear device of the type described, the combination with the drive and driven shaft and a transmission therebetween comprising a plurality of gear trains, of a dog clutch comprising a driving and driven member incorporated in the intermediate gear train, weights incorporated in the transmission so as to be held outward by centrifugal action and inward as the force is overcome by load, means actuated by the inward motion of the weight to release the clutch to permit increased speed of the drive shaft and by backward drag on the drive shaft to permit decreased speed of the drive shaft, means for preventing slipping contact of the dog of the clutch driving member when disengaged from the driven clutch member and to silently actuate its engagement as the clutch members synchronize.

27. In a change gear device of the type described, the combination with the drive and driven shaft and a transmission therebetween comprising a plurality of gear trains of different gear ratios, of a floating member incorporated in the transmission, tooth rings respectively on a member of the intermediate gear train and the driven shaft, a toothed member mounted axially on the floating member, means actuated by the relative movement of the drive shaft and floating member to move the drive ring axially into engagement with either of the toothed members, and means on the toothed ring for catching either toothed member upon synchronization to hold the floating member in the tooth engaging position as the ring is moved axially into the engaging position.

28. A change gear device of the type described comprising a drive and driven shaft and a transmission therebetween having a plurality of releasable gear trains, floating and adjacent torque transmitting members incorporated in the aforesaid transmission having a limited freedom of angular movement with respect to each other and adapted to engage each other at a plurality of spaced apart train closing positions, means actuated by relative turning movement of the floating and adjacent members in one direction due to retardation of the drive shaft for changing the drive from a lower to a higher gear train and by the relative movement in the opposite direction due to the advance of the drive for changing from a higher to a lower gear train, and spring means for holding the floating member and adjacent member between two gear train positions during the changing from one gear train to another the said floating member being connected to the gear trains and the said adjacent member being connected to one of the aforementioned shafts.

29. In a change gear device of the type described, the combination with the drive and driven shafts and a plurality of gear trains therebetween and clutch mechanisms incorporated in each gear train, of a floating member having an interchangeable driving connection formed through the clutch mechanisms to the gear trains and turnably mounted to turn around on one of said shafts and having a limited angular freedom therewith, a driving connection between the floating member and the said shaft comprising pressure members on one and coacting cams on the other adapted to receive a driving thrust at a plurality of driving positions throughout the length of the cam and so formed that such thrust is not received between the driving positions, and means actuated by relative motion of the floating member between the said driving positions for operating the clutch mechanism to change the drive from one gear train to another.

30. In an automatic clutch device, the combination with releasable clutch parts, of two adjacent torque transmitting members having a torque transmitting connection with the clutch parts and having some mutual angular freedom of movement between torque transmitting and release positions, means for locking the adjacent members together in the torque transmitting position and for unlocking them to allow relative motion in the direction of such torque transmitting to carry them freely to the release position, clutch operating means controlled by mutual displacement of the adjacent members adapted to release the clutch parts as the unlocked and therefore non-torque transmitting adjacent members move toward the release position.

31. In an automatic clutch device, the combination with the main driving and driven parts, of a floating member carried with one of these main parts and adapted to move across an arc of displacement therewith between a drive and a release position, clutch parts between the floating member and the other main part, a catch device operated by synchronization and retardation of the main driving part adapted to actuate movement of the floating member to the drive position, means for locking the floating member in the drive position to transmit torque and for unlocking it to allow the advance of the main driving part to carry it freely to the release position, and clutch operating means controlled by motion of the unlocked floating member as it moves across the arc of displacement for setting the clutch parts in the drive transmitting position as the floating member moves to the drive position and to release them as it moves to the release position and so to operate them while the floating member is moving across the arc substantially without resistance.

32. In an automatic clutch device, the combination with the main driving and driven parts, of a floating member carried with an adjacent one of these main parts adapted to move across an arc of displacement therewith between a drive and a release position, clutch parts between the floating member and the other main part, means operated on synchronization and retardation of the main driving part adapted to actuate movement of the floating member to the drive position, clutch operating means controlled by motion of the floating member adapted to set the clutch parts in a drive condition as the floating member moves to the drive position and to release them as it moves to the release position, locking control means between the floating member and adjacent main part comprising resilient pressure members on one and cams on the other, pockets formed in the said cams in which the pressure members enter to lock the floating member in the drive position and out of which they are forced by overload to unlock it to allow the advance of the main driving part to carry it to the release position, and with portions over which the pressure members run substantially without resistance during the aforementioned operation of the clutch parts and with portions adapted to cushion the shock if relative motion of the floating member is arrested.

33. In an automatic clutch device, the combination, with the main driving and driven parts, of a floating member carried with an adjacent one of these main parts and adapted to move across an arc of displacement therewith between a drive and release position, clutch parts between the floating member and the other main part, means operated by retardation and synchronization of the main driving part adapted to acuate movement of the floating member to the drive position, clutch operating means controlled by motion of the floating member adapted to set the clutch parts in the drive transmitting condition as the floating member moves to the drive position and to release them as it moves to the release position, locking control means between the floating member and adjacent main part comprising cams on one of them and on the other resilient pressure members actuated by centrifugal force and spring force, pockets formed in the said cams into which the pressure members enter to lock the floating members in the drive position and out of which they are forced by overload to unlock it to allow the advance of the main driving part to carry it to the release position, and portions over which the pressure members run substantially without resistance during the aforementioned operation of the clutch parts and with portions adapted to cushion shock if relative motion of the floating member is arrested.

34. In an automatic clutch device, the combination with the drive and driven shafts, of a floating member having an arc of mutual freedom with one of said shafts, a driving connection therebetween adapted to lock the floating member in the drive position to transmit the drive and to unlock it to allow the advance of the drive shaft to carry it freely across the arc to a release position and by retardation thereof to carry it freely to the drive position, clutch parts between the floating member and the other shaft including a set of teeth on the shaft, and a toothed ring slidable on the floating member, clutch operating mechanism controlled by the floating member to release the toothed ring as the floating member moves to the release position and to engage it as the floating member moves to the drive position, and a catch device between the clutch parts actuated by synchronization and retardation of the drive shaft to effect a catch between them and position them for engagement.

GIBBS BLACKSTOCK.